US008694261B1

(12) United States Patent
Robinson

(10) Patent No.: US 8,694,261 B1
(45) Date of Patent: Apr. 8, 2014

(54) 3D-WELL LOG INVENTION

(76) Inventor: Mark C. Robinson, Spring, TX (US)

(*) Notice: Subject to any disclaimer, the term of this patent is extended or adjusted under 35 U.S.C. 154(b) by 617 days.

(21) Appl. No.: 12/911,272

(22) Filed: Oct. 25, 2010

Related U.S. Application Data

(60) Provisional application No. 61/313,211, filed on Mar. 12, 2010.

(51) Int. Cl.
*G01V 1/00* (2006.01)
*G01V 1/28* (2006.01)

(52) U.S. Cl.
USPC .............................................. 702/14; 702/16

(58) Field of Classification Search
USPC ....................................................... 702/14, 16
See application file for complete search history.

(56) References Cited

U.S. PATENT DOCUMENTS

| | | | | |
|---|---|---|---|---|
| 5,012,675 A * | 5/1991 | Koller et al. | ................. | 73/432.1 |
| 7,054,753 B1 * | 5/2006 | Williams et al. | ................ | 702/13 |
| 7,706,981 B2 | 4/2010 | Wilkinson et al. | | |
| 8,423,337 B2 * | 4/2013 | Hsu et al. | ........................... | 703/9 |
| 2002/0038201 A1 * | 3/2002 | Balaven et al. | ................... | 703/2 |
| 2004/0225443 A1 * | 11/2004 | Kamps | ............................. | 702/14 |
| 2006/0280031 A1 * | 12/2006 | Chopra et al. | .................. | 367/68 |
| 2010/0094559 A1 * | 4/2010 | Contreras et al. | ............... | 702/14 |

OTHER PUBLICATIONS

Robins et al. "Visualizing Cortical Waves and Timing from Data." 2008. pp. 401-408.*
Pierce et al. Visualizing Geophysical Data: Teasing Meaning from Models. 1995. pp. 4-5.*
Kirby, Robert M. II. Visualizing Fluid Flow Data. May 2001.*
Green et al. "Visualizing Legacy Stratigraphic Data from Archaelogical Handbooks." 2002.*
Sada Version 5 User's Guide, Chapter 28—Basic Geospatial Methods, University of Tennesee 2008.*
Robinson, M. C. 2012—Stratal slicing the Permian "Wolfberry" trend of the Midland Basin, Texas with geophysical well-log data, (Presented orally to the West Texas Geological Society, Midland, TX, Sep. 27, 2012).
Wylie, A. S. and Huntoon, J. E. 2003—Log-curve amplitude slicing: Visualization of log data and depositional trends in the Middle Devonian Traverse Group, Michigan basin, United States, AAPG Bulletin, v. 87, No. 3, pp. 581-608.
Carr, Tim et al., 2-D and 3-D Pseudo-Seismic Transforms of Wireline Logs: A Seismic Approach to Petrophysical Sequence Stratigraphy, Mar. 12, 2010, http://www.kgs.ku.edu/PRS/publication/carrintro.html.
Denham, L.R. et al., Rock Property Data Volumes from Well Logs, Nov. 3, 2007, Search and Discovery Article #40268 (2007).

* cited by examiner

*Primary Examiner* — John Breene
*Assistant Examiner* — Yaritza H Perez Bermudez
(74) *Attorney, Agent, or Firm* — Daniel N. Lundeen; Lundeen & Lundeen PLLC

(57) ABSTRACT

In an embodiment, creation of a continuous three dimensional array of data from digital information obtained from a wellbore, and representation in a seismic data formatted dataset. In an embodiment, providing the capability to export stratigraphic interpretations made while working within the 3D-log data volume back to any wellbore that is encompassed within the areal extent of the 3D-log data volume. In one embodiment, a 2D well grid creation process comprises the steps of (a) selecting an initial grid spacing, (b) assigning wells from a dataset of well data to closest nodes in the grid, (c) if a plurality of wells are assigned to a single node after completing step (b), narrowing the grid spacing and repeating step (b) until no more than one well is assigned to any node. In an embodiment the non-well nodes are populated by extrapolating from adjacent single well nodes.

21 Claims, 14 Drawing Sheets

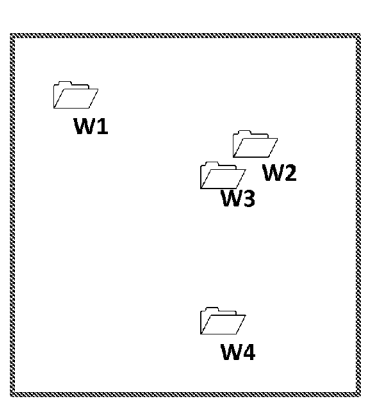
Figure 11. Initial locations of wells(W1-W4)
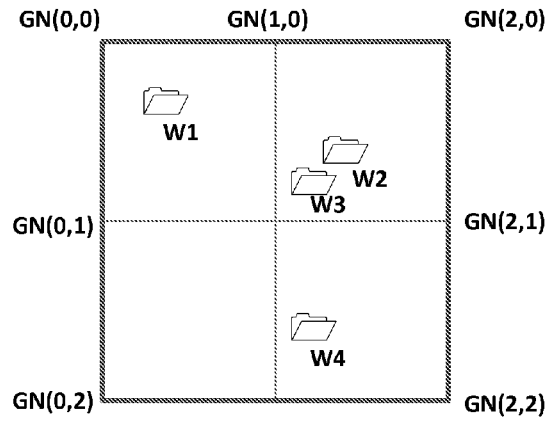
Figure 12. Initial Grid Creation (GN(0,0) – GN(2,2))
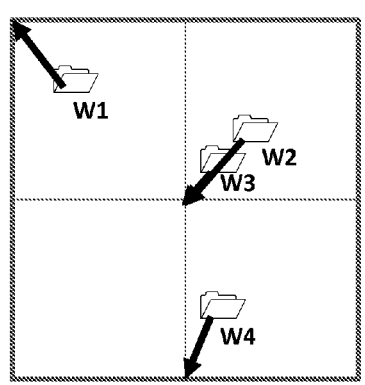
Figure 13. Well association with nodes:
W1-GN(0,0)
W2-GN(1,1)
W3-GN(1,1)
W4-GN(1,2)
W2 and W3 wells at same node, requires grid refinement.
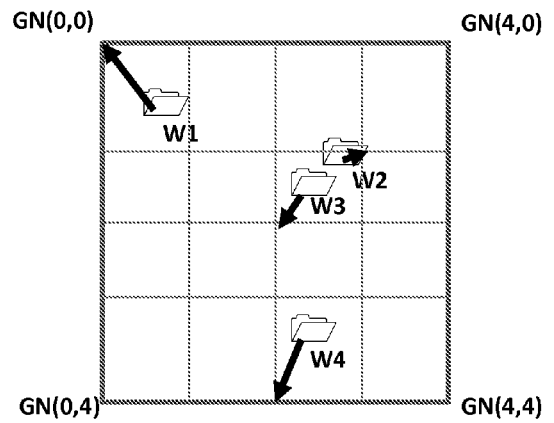
Figure 14. Well association with refined Grid nodes:
W1-GN(0,0)
W2-GN(3,1)
W3-GN(2,2)
W4-GN(2,4)
All wells assigned to unique nodes.

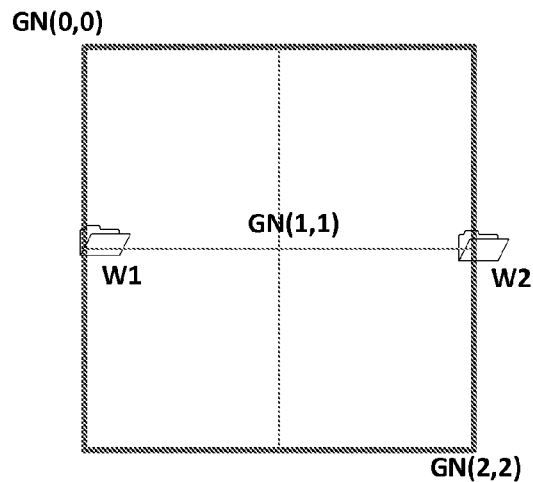
Figure 15. Plan view of wells W1 and W2 assigned to nodes.
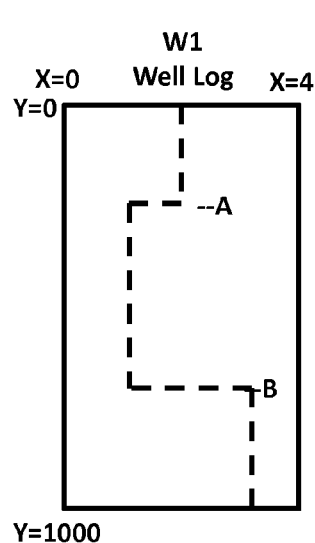
Figure 16. Generalized well log for Well W1 with stratigraphic correlations A and B.
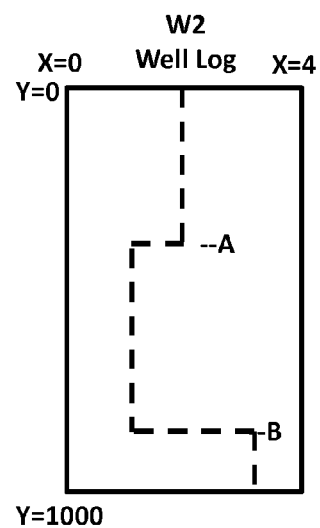
Figure 17. Generalized well log for Well W2 with stratigraphic correlations A and B.

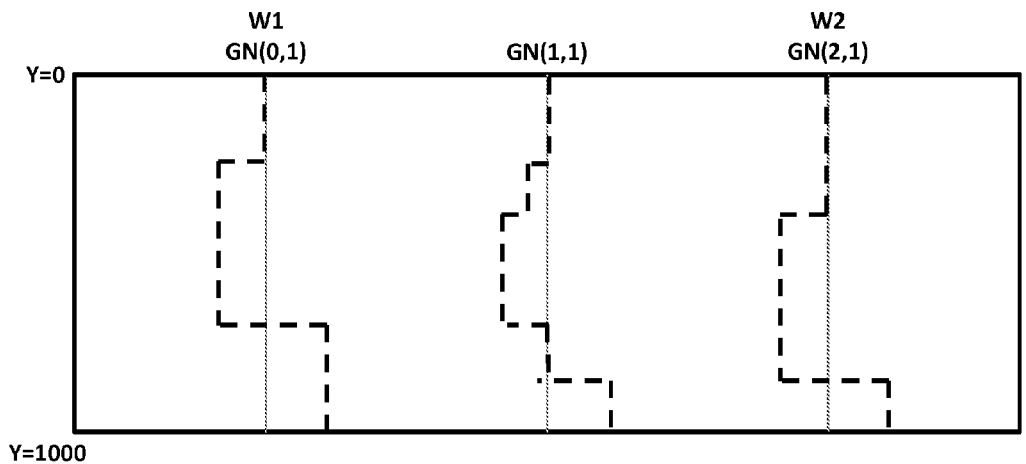
Figure 18. Generated well log for node GN(1,1) if stratigraphic correlations A and B not used.
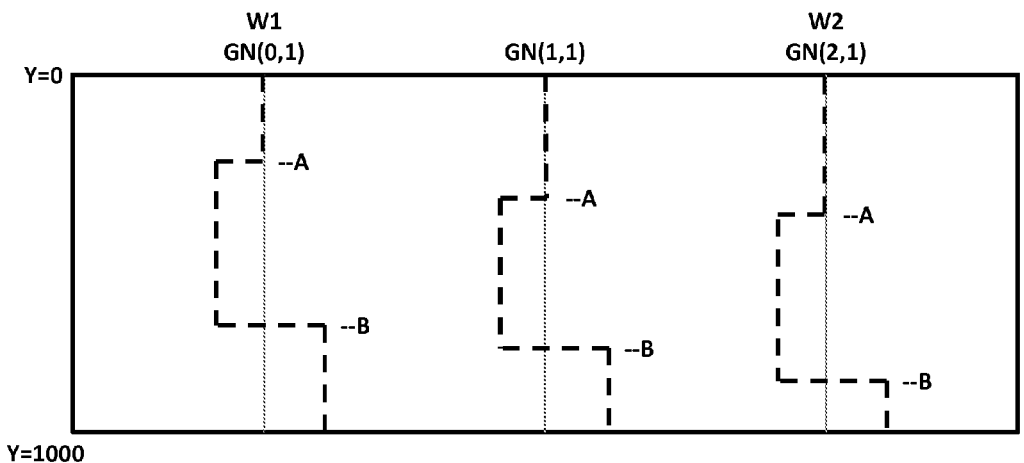
Figure 19. Generated well log for node GN(1,1) if stratigraphic correlations A and B are used.

3D-WELL LOG INVENTION

CROSS REFERENCE TO RELATED APPLICATIONS

This application is a non-provisional of U.S. 61/313,211, filed Mar. 22, 2010.

BACKGROUND

The term "pseudo-seismic" has been used to describe efforts to convert any non-seismic data type into the seismic data domain. Previous workers converted digital well-log data into SEG-Y format and loaded those data into seismic workstations. The results were less than acceptable because of the discontinuous nature of wellbore data and the fact that the method destroyed the connection between the actual wellbore location and the location of the trace to which it has been assigned. See Carr et al., 2-D and 3-D Pseudo-Seismic Transforms of Wireline Logs: A Seismic Approach to Petrophysical Sequence Stratigraphy, Open-File Reports, Kansas Geological Survey, University of Kansas (1995) (available at http://www.kgs.ku.ecu/PRS/publication/carr.html); Escaloma et al., Sequence Stratigraphic analysis of Eocene clastic foreland deposits in central Lake Maracaibo using high-resolution well correlation and 3-D seismic data., AAPG Bulletin, V. 90, No. 4, pp. 581-623 (April 2006).

For example, previous workers also calibrated seismic attribute data with wellbore data to generate pseudo-well logs to predict the nature of rocks at a given location. The method used 3D-seismic attribute data as input to derive expected values of standard well log curves at a single location, which may be a wellbore or a hypothetical wellbore location. For example, see U.S. Pat. No. 7,706,981.

Denham and Nelson, Rock Property Data Volumes from Well Logs, Search and Discovery Article #40268 (2007), generated rock property data in 60 meter vertical sample intervals for wellbores and loaded these data into a regular grid. The values of the grid nodes were averaged based upon the proximity of the wellbores selected within a given radius of the wellbore. They concluded that the technique was suitable for regional analysis only.

U.S. Pat. No. 7,054,753 discloses a method of locating oil and gas exploration prospects by data visualization and organization by digitizing well log data, marking common geologic time markers and visually displaying the data in various viewing formats.

All references mentioned herein are hereby incorporated herein by reference in their entireties for all purposes.

SUMMARY OF THE INVENTION

The present invention relates in one aspect to the creation of a continuous three dimensional array of data derived from digital information obtained from various depths within a wellbore, and the representation of these data in a formatted dataset that can be manipulated in standard 3D-seismic interpretation and visualization software. The invention also relates in another aspect to providing the capability to export stratigraphic interpretations made while working within the 3D-log data volume back to any wellbore that is encompassed within the areal extent of the 3D-log data volume.

In one embodiment, a 2D well grid creation process comprises the steps of (a) selecting an initial grid spacing, (b) assigning wells from a dataset of well data to closest nodes in the grid, (c) if a plurality of wells are assigned to a single node after completing step (b), narrowing the grid spacing and repeating step (b) until no more than one well is assigned to any node.

In another embodiment, a 3D well log grid creation process comprises the step of associating tabulated well log data with a matrix of grid nodes with single wells assigned to single nodes. In a further embodiment, the tabulated well log data can comprise stratigraphic correlations by well, whereby the 3D well log grid comprises a matrix of grid nodes with stratigraphic correlations assigned to the single-well nodes. Further still, in an embodiment the process can include populating non-well nodes with stratigraphic correlation data.

In an embodiment, the 3D well log grid creation process can include populating non-well nodes with well log data extrapolated from single-well nodes. Further, in one embodiment stratigraphic tops are used to control the non-well node population. In one embodiment, the all-node-populated 3D matrix of well log data is converted to a seismic data format such as, for example, SEG-Y, SEG P1, as defined by the Society of Exploration Geophysics (SEG), and so on. The 3D well log dataset can be interpreted using standard seismic industry software, e.g., petrophysical, log facies, structural and other interpretations; further the interpretations can be associated with a well process at a specific well through the use of unique well identifiers, e.g., completion and production of oil and gas wells, the creation of pseudo wells to evaluate exploration opportunities, and the like.

BRIEF DESCRIPTION OF THE DRAWINGS

FIG. 11 is a plan diagram of the location of hypothetical wells W1, W2, W3 and W4 associated with well log data according to an embodiment of the invention as described in the examples below.

FIG. 12 is a plan diagram of the wells of FIG. 11 with an initial grid system applied according to an embodiment of the invention as described in the examples below.

FIG. 13 is a plan diagram of the wells and grid of FIG. 12 showing association of the wells to the nearest grid node according to an embodiment of the invention as described in the examples below, wherein more than one well is associated with a grid node.

FIG. 14 is a plan diagram of the wells of FIGS. 11 to 13 following reduction (halving) of the grid spacing from FIG. 12 showing association of the wells to the nearest grid node according to an embodiment of the invention as described in the examples below, wherein no more than one well is associated with any grid node.

FIG. 15 is a plan diagram of hypothetical wells W1, W2 showing assignment to grid nodes according to an embodiment of the invention as described in the examples below.

FIG. 16 shows a generalized well log for well W1 of FIG. 15 with stratigraphic correlations A and B according to an embodiment of the invention as described in the examples below.

FIG. 17 shows a generalized well log for well W2 of FIG. 15 with stratigraphic correlations A and B according to an embodiment of the invention as described in the examples below.

FIG. 18 shows a generated well log for node GN(1,1) of FIG. 15 by mathematical averaging without applying stratigraphic correlations according to an embodiment of the invention as described in the examples below.

FIG. 19 shows a generated well log for node GN(1,1) of FIG. 15 by applying stratigraphic correlations according to an embodiment of the invention as described in the examples below.

DESCRIPTION OF THE INVENTION

Figure 1:
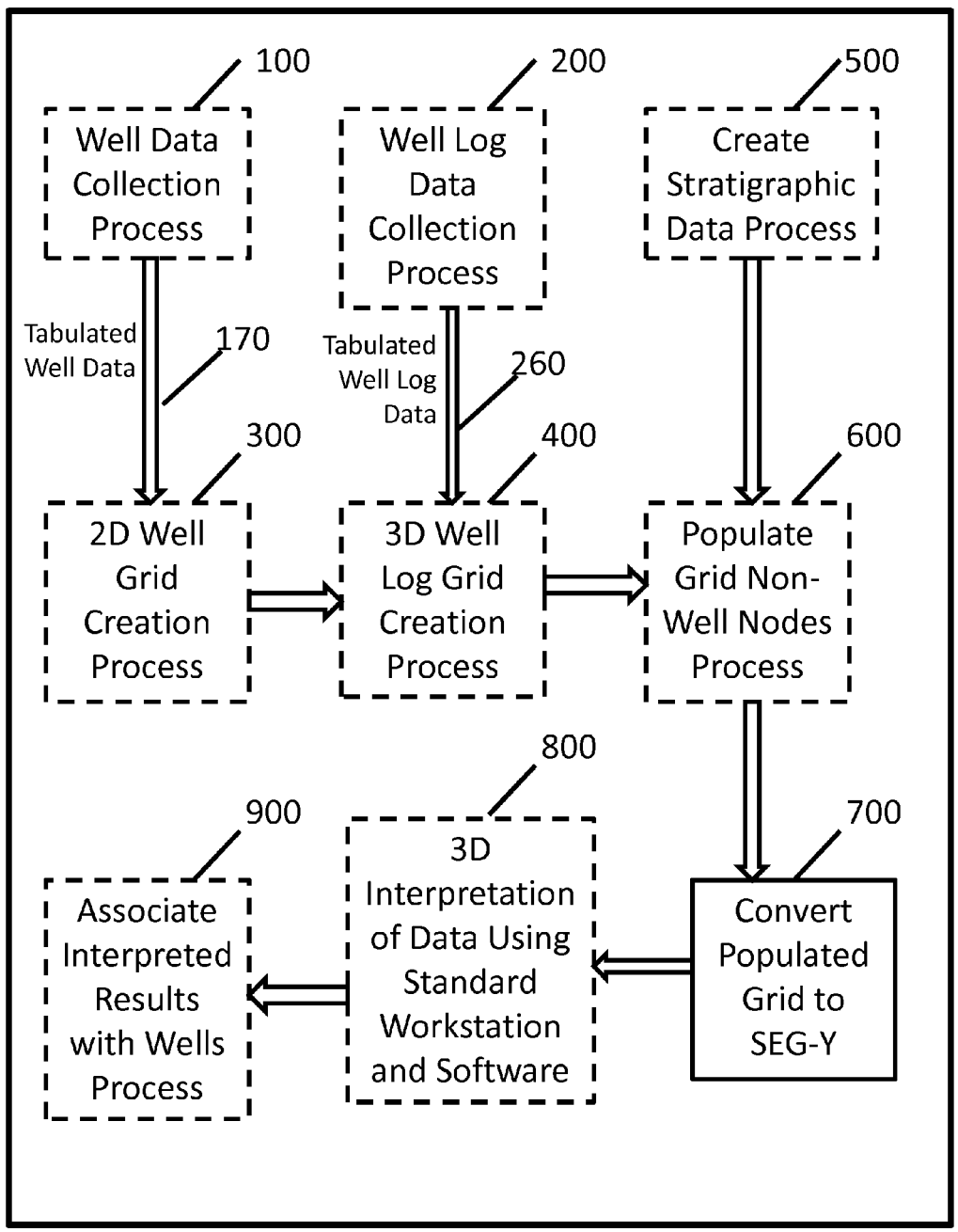
FIG. 1 is a schematic overview of a 3D well log data process according to an embodiment of the invention.

With reference to FIG. 1, the 3D-log process according to one embodiment of the invention provides a means to take depth dependent measurements from a randomly spaced collection of wellbores and create a continuous volume of data that can be loaded into software designed to interpret and visualize a 3D-Seismic dataset.

Figure 2:
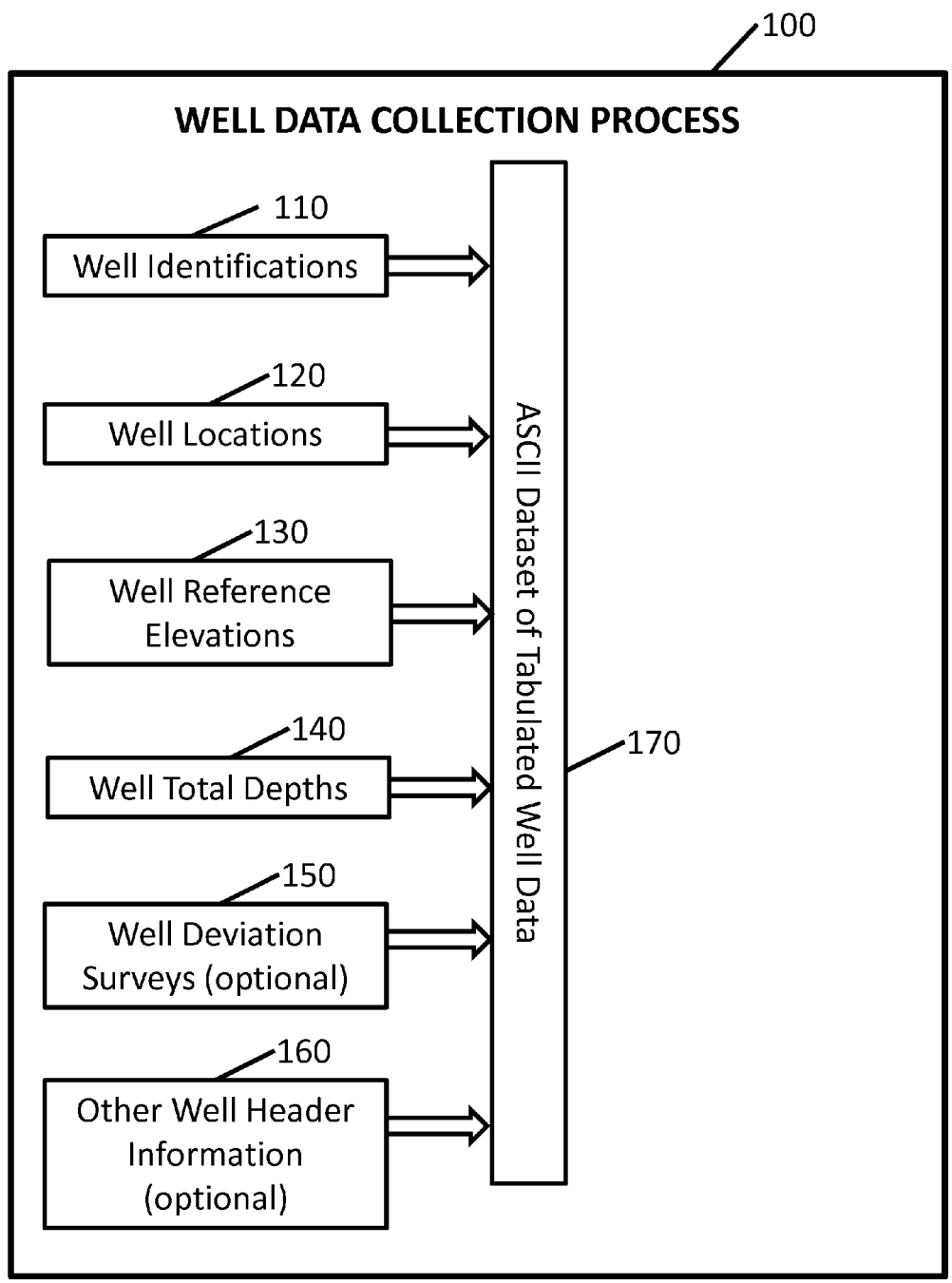
FIG. 2 is a schematic diagram of a general well data collection process according to an embodiment of the invention.
Figure 3:
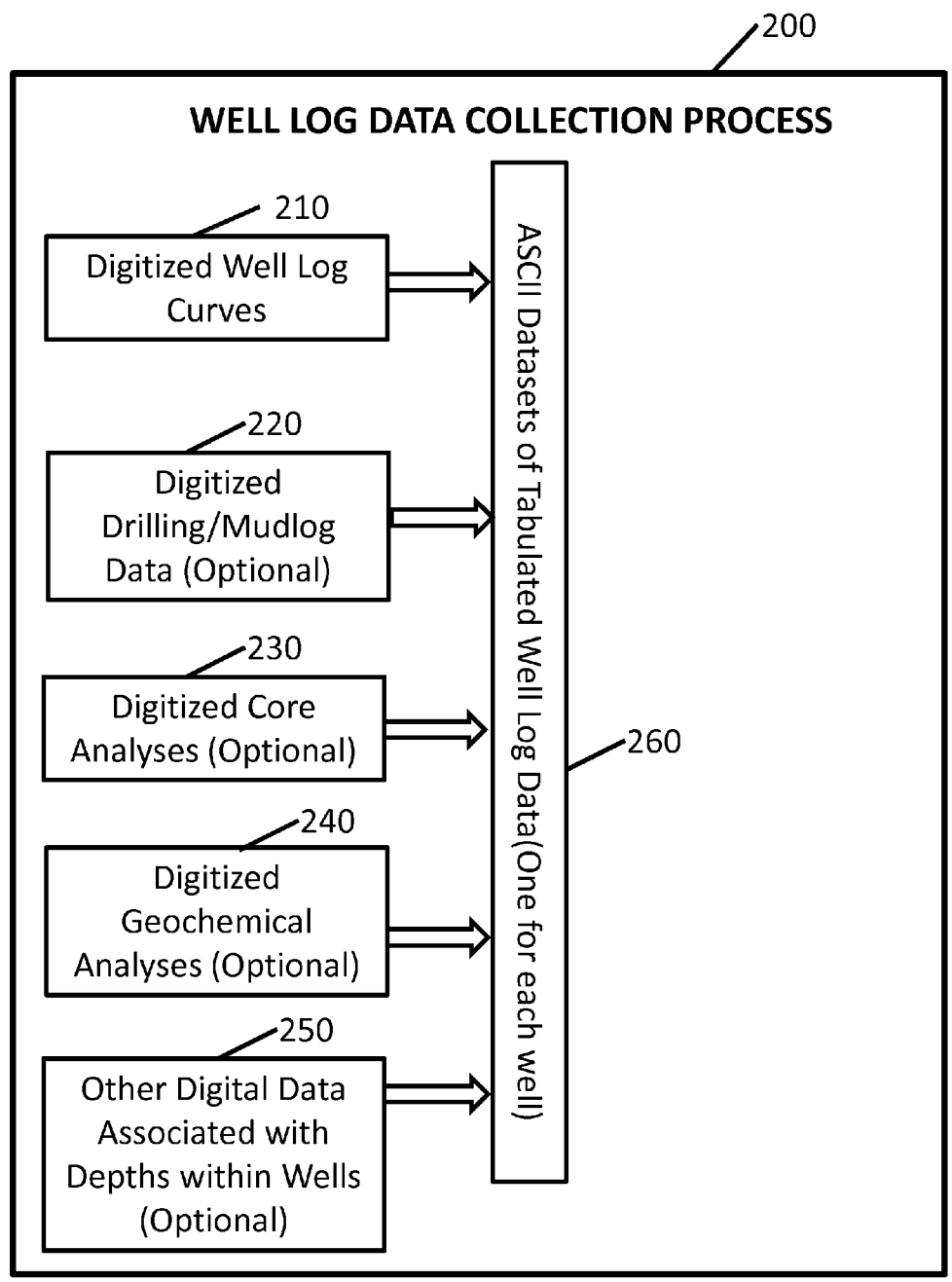
FIG. 3 is a schematic diagram of a well log data collection process according to an embodiment of the invention.

One embodiment shown in FIGS. 2 and 3 utilizes digital wellbore data as input. Examples can include geophysical well-log curves 210 collected from wire-line logging of wellbores, core analyses performed on cores collected during drilling of wells, and virtually any other data attribute that can be quantified and associated with a depth within a wellbore.

The reference elevation 130 (FIG. 2), i.e., the elevation above mean sea level from which borehole measurements are taken, of each wellbore to be used, in one embodiment is available to the process.

Figure 4:
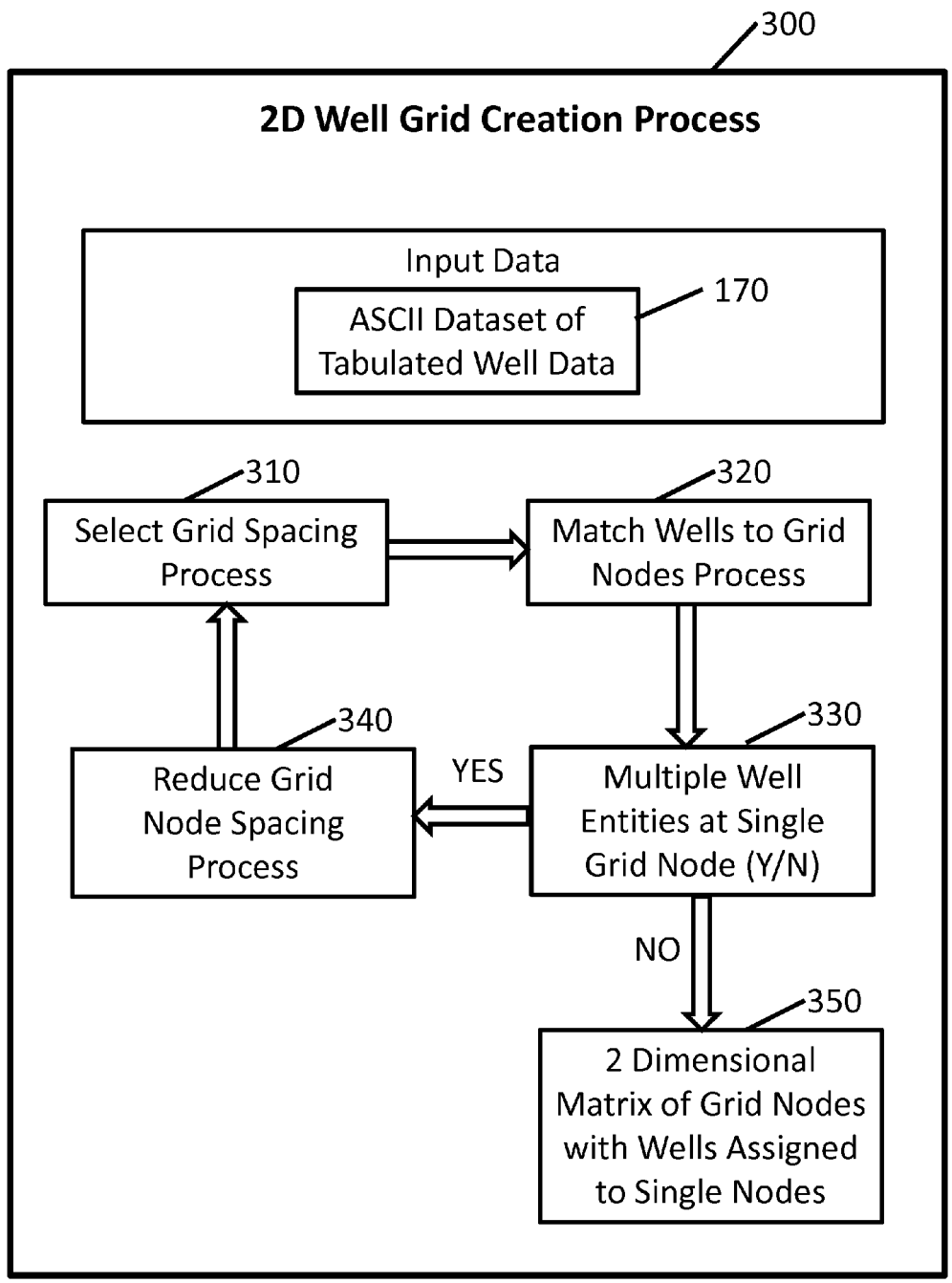
FIG. 4 is a schematic diagram of a 2D well grid creation process according to an embodiment of the invention.
Figure 5:
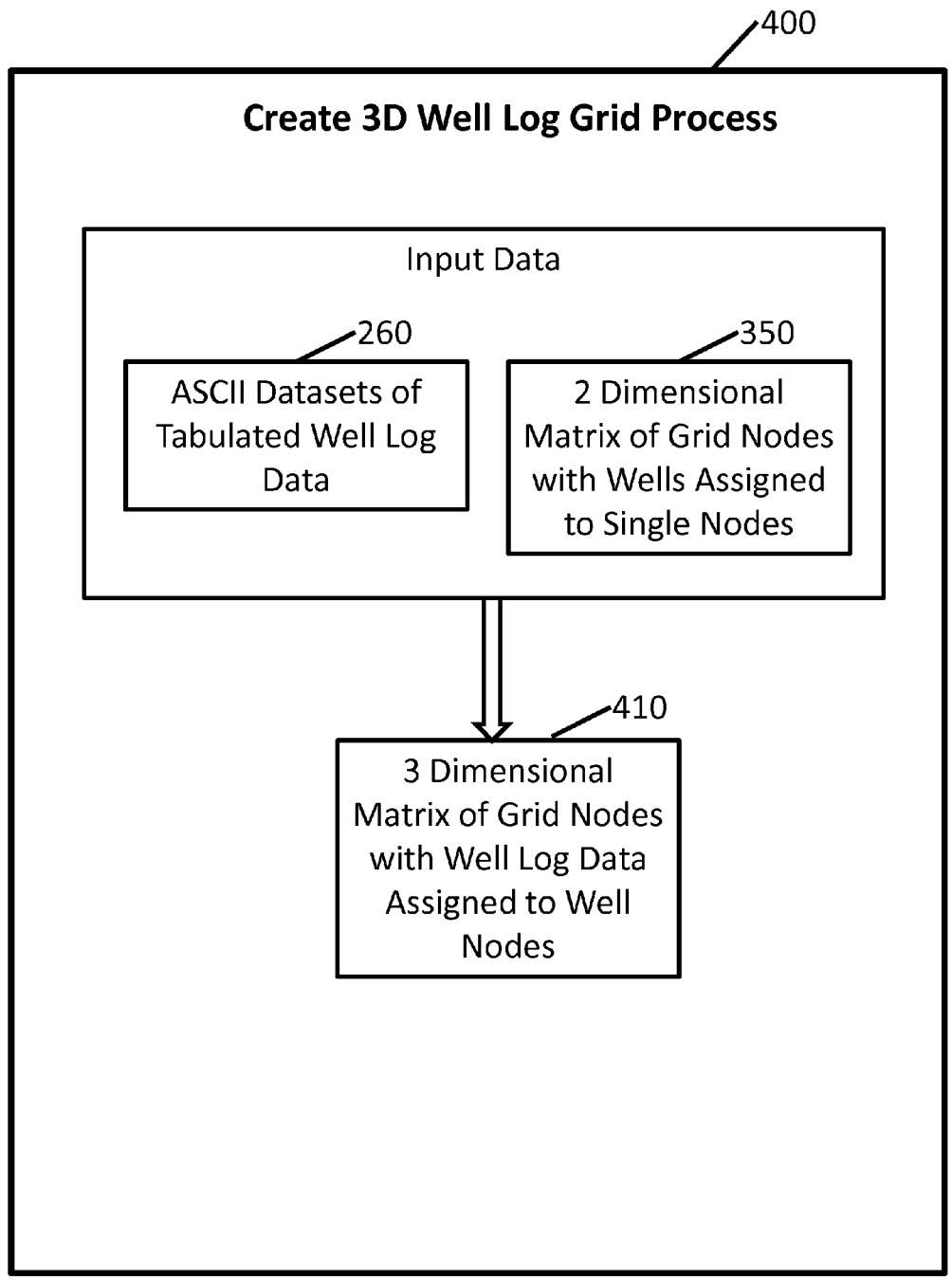
FIG. 5 is a schematic diagram of a 3D well grid creation process according to an embodiment of the invention.
Figure 6:
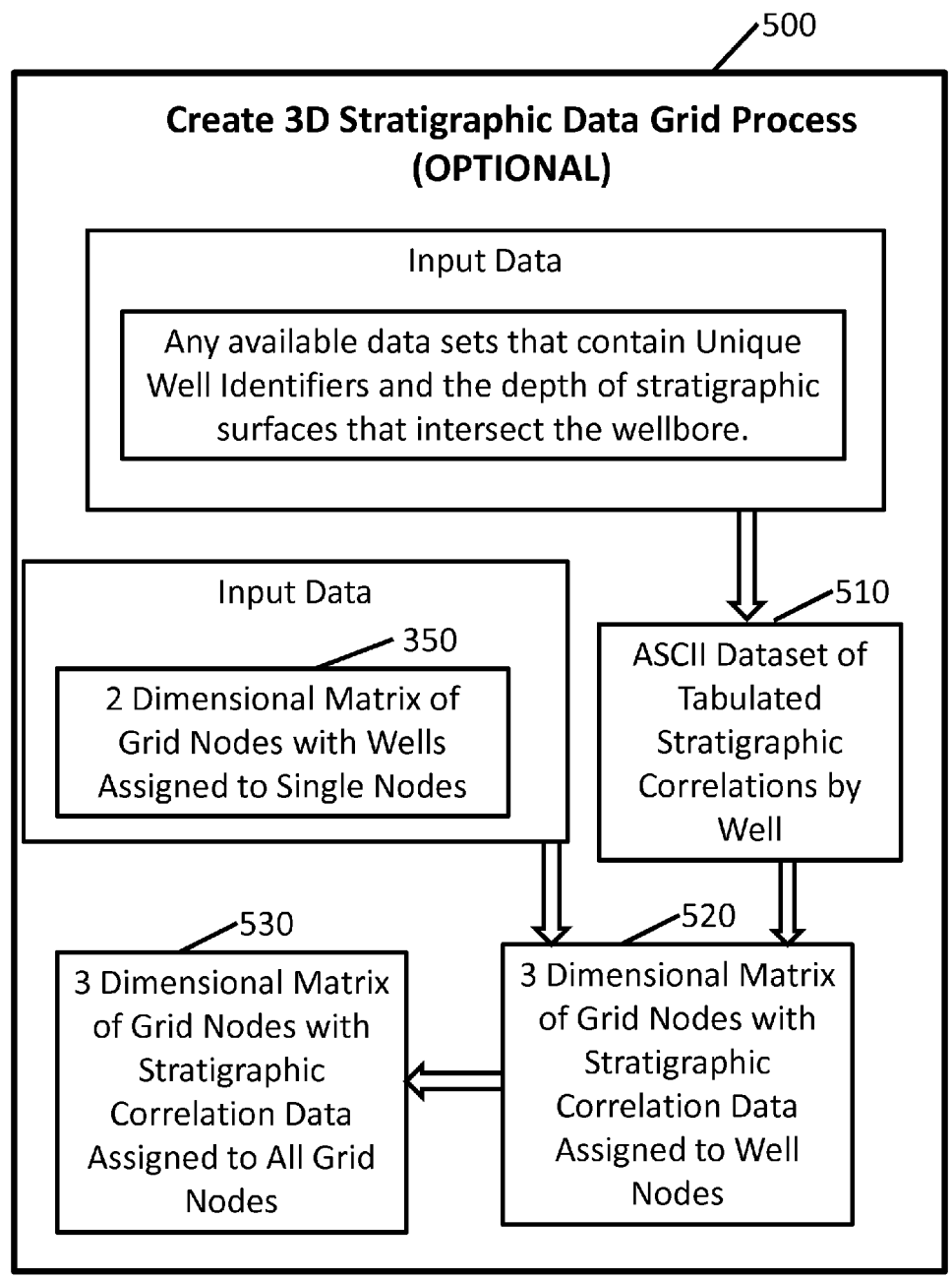
FIG. 6 is a schematic diagram of an alternative 3D well grid creation process involving stratigraphic correlations according to an embodiment of the invention.
Figure 7:
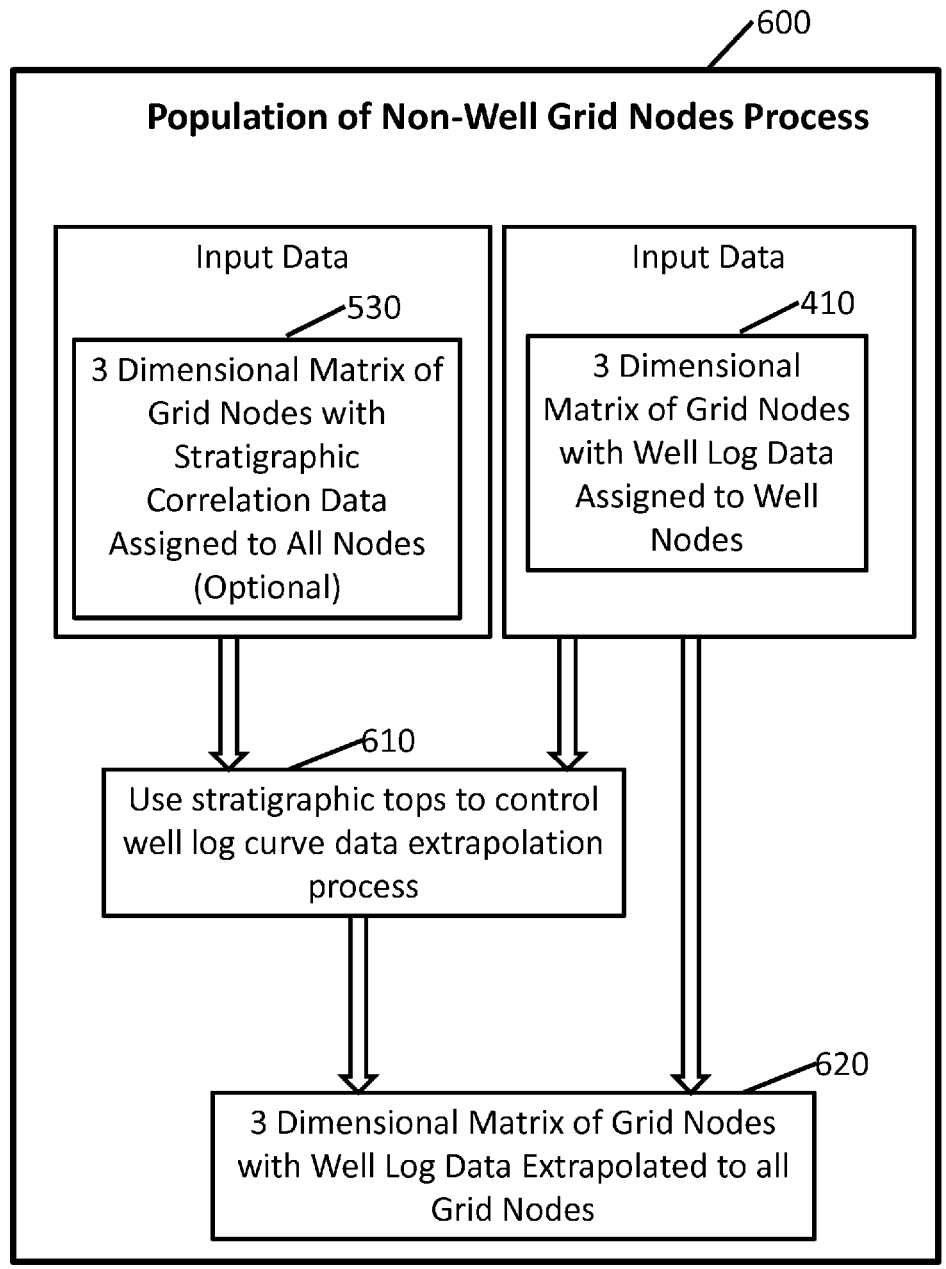
FIG. 7 is a schematic diagram of a process to populate non-well grid nodes according to an embodiment of the invention.

In an embodiment, in step 310 (FIG. 4) a uniform grid with constant spacing between nodes is superimposed over an area that encompasses all wellbores to be used. Common grid node spacings can be from 10 to 100 meters, but smaller or larger spacings can be used if desired. In one embodiment, a uniform grid spacing can include spacing that can be the same or different with respect to the X- and Y-axes, e.g. a relatively larger spacing along one axis than the other.

In an embodiment, each wellbore can have a unique identifier carried as an attribute of the node nearest to its actual location. This unique identifier can be the American Petroleum Institute (API) identifier or any other suitable identifier.

In an embodiment, no two wellbores can be assigned to the same grid node. The grid spacing can be reduced in an iterative process in one embodiment, or one of the wellbores can be moved to the next nearest available node in an alternative or additional embodiment.

In an embodiment, utilizing an algorithm of triangulation, each grid node that has not been assigned to an actual wellbore will have calculated a weighting function based upon the distance between it and all grid nodes with assigned data, which will be kept in an array for reference within the processing according to the following equation:

$$GN_{(0,n)} = DF/f(DN)$$

where GN is the array of grid nodes containing the weighting function values; DF is a weighting constant that can be allocated prior to processing; f(DN) is a function that can be allocated prior to processing, allowing flexibility in determining, for example, whether a linear or exponential data relationship exists between the grid nodes; and DN is the distance between the grid node being evaluated and a grid node with an assigned well.

According to an embodiment, a data value can be determined for each depth increment at each wellbore by using the gridnode (GN) values calculated, and performing a summation of all wellbore data at the same measured depth multiplied by the respective GN value for wells within a defined search radius.

In an embodiment, the results can be assigned to a trace array for each bin.

Figure 8:
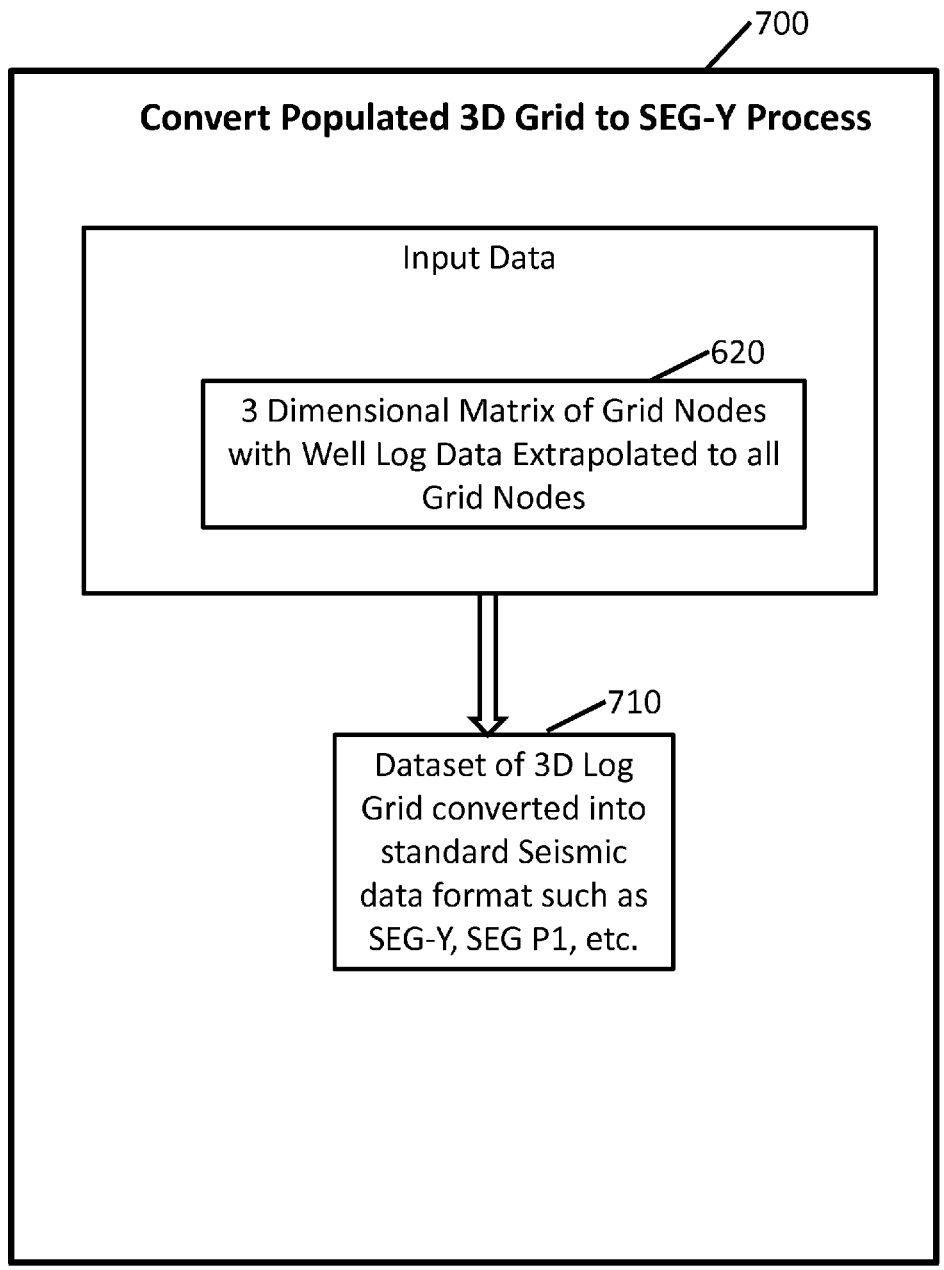
FIG. 8 is a schematic diagram showing conversion of a 3D well grid into a standard seismic data format according to an embodiment of the invention.

As shown in FIG. 8, SEGY files are generated for the 3D-log survey.

Figure 9:
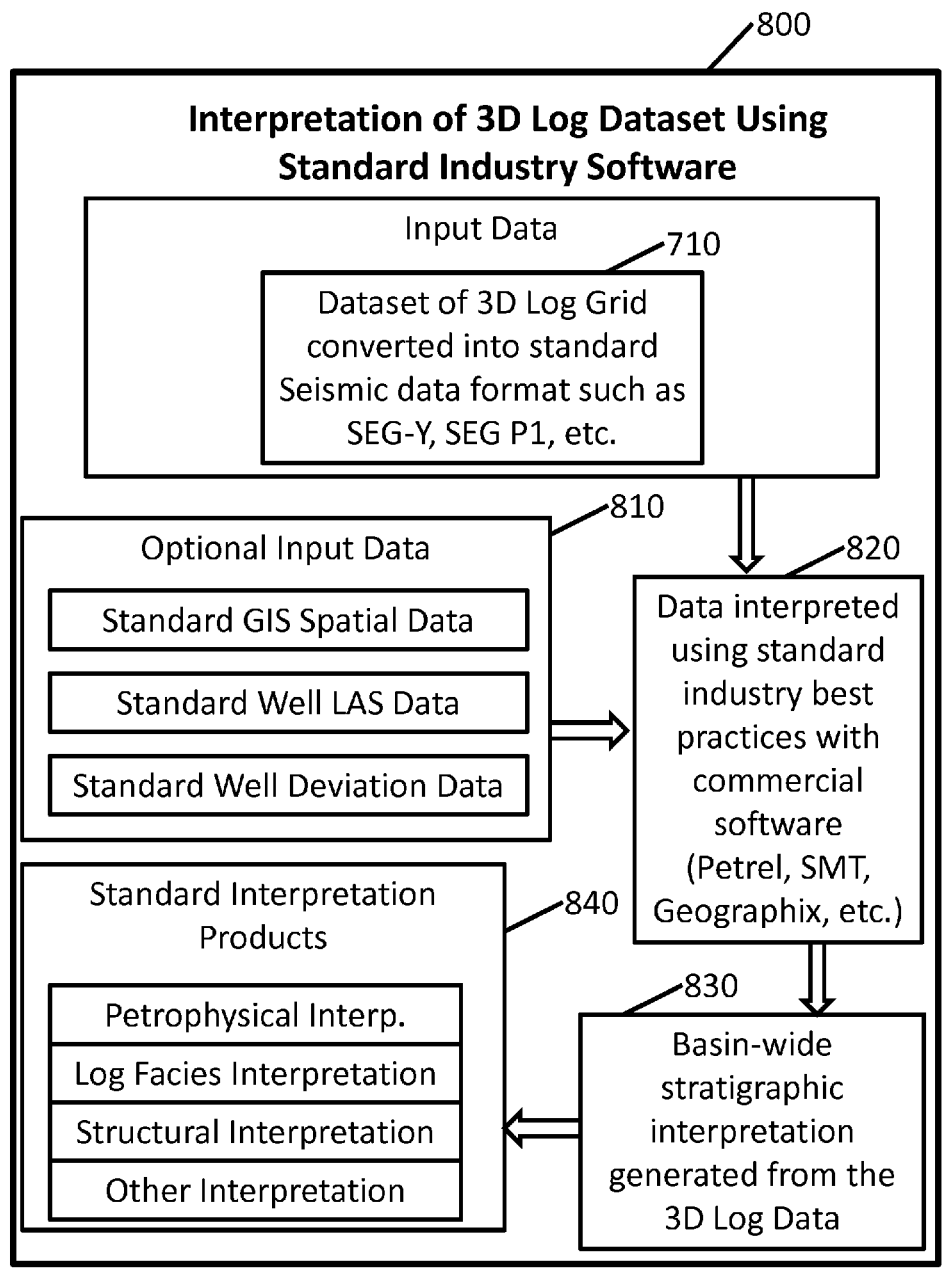
FIG. 9 is a schematic diagram of interpretation of 3D log dataset in standard seismic data format using standard industry software according to an embodiment of the invention.
Figure 10:
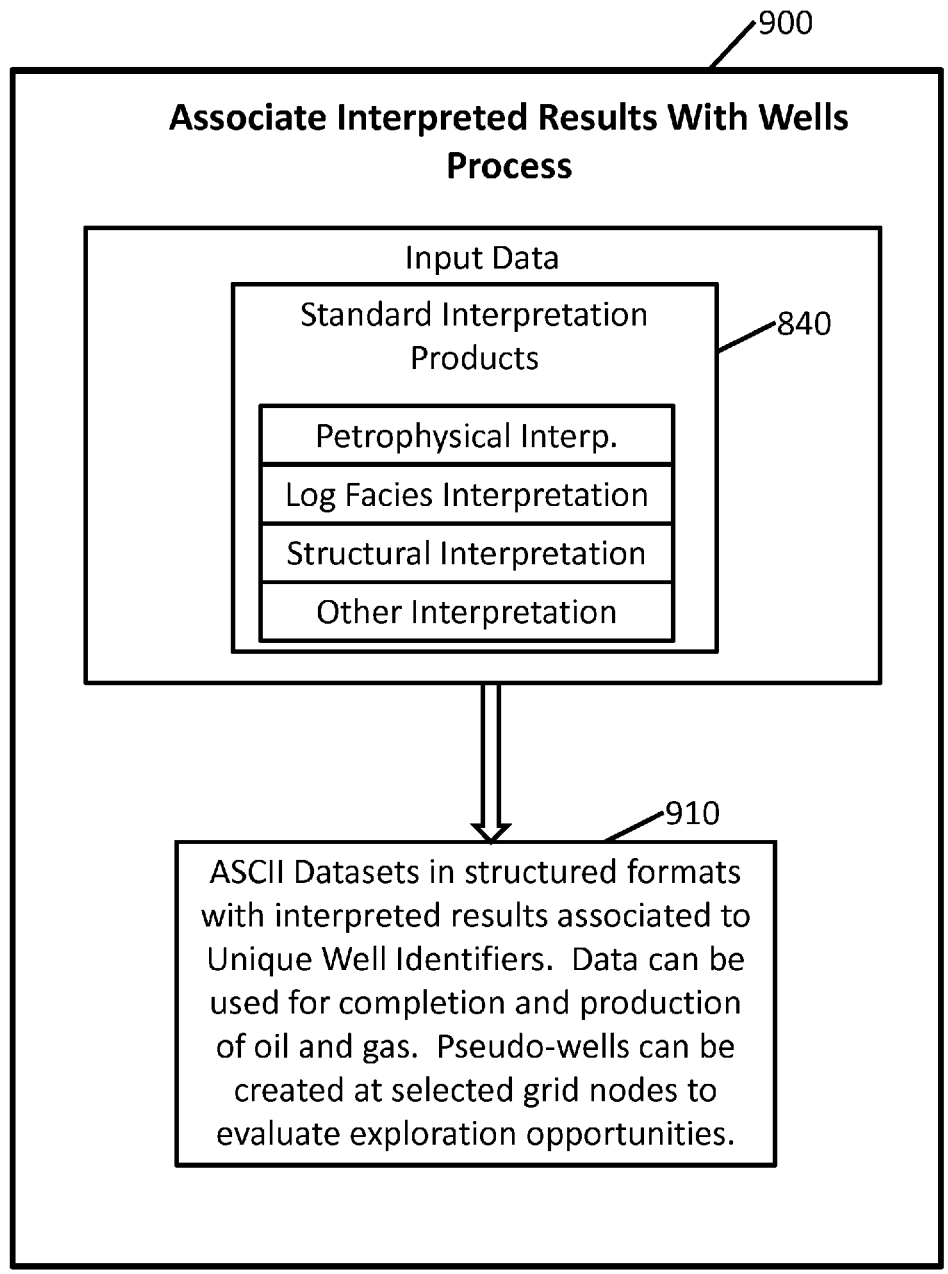
FIG. 10 is a schematic diagram of a process to associate the interpretations of FIG. 9 with specific wells (or pseudo-wells) according to an embodiment of the invention.

After interpretation in any standard exploration workstation according to the embodiment of FIGS. 9 and 10, the interpretations are output and reformatted for loading into well databases and interpretation systems.

Accordingly, the invention provides the following embodiments:

A. A process to create a 2D well grid, comprising the steps of:
  a. selecting an initial 2D grid spacing,
  b. assigning wells from a dataset of well data to closest nodes in the grid, and
  c. if a plurality of wells are assigned to a single node after completing step b, narrowing the grid spacing and repeating step b until no more than one well is assigned to any node.

B. A process to create a 3D well log grid, comprising the step of associating tabulated well log data with a matrix of grid nodes wherein single wells are assigned to single nodes to generate a 3D well log grid.

C. The process of Embodiment B comprising generating the matrix of grid nodes by the steps of:
  a. selecting an initial 2D grid spacing,
  b. assigning wells from a dataset of well data to closest nodes in the grid, and
  c. if a plurality of wells are assigned to a single node after completing step b, narrowing the grid spacing and repeating step b until no more than one well is assigned to any node.

D. The process of Embodiments B or C wherein the tabulated well log data comprise stratigraphic correlations by well, whereby the 3D well log grid comprises a matrix of grid nodes with stratigraphic correlations assigned to the single-well nodes.

E. The process of any one of Embodiments A, B, C, or D, further comprising populating non-well nodes with stratigraphic correlation data.

F. The process of any one of Embodiments A, B, C, D, or E, further comprising populating non-well nodes with well log data extrapolated from single-well nodes.

G. The process of Embodiments E or F, wherein stratigraphic tops are used to control the non-well node population.

H. The process of any one of Embodiments E, F, or G, further comprising converting the all-node-populated 3D matrix of well log data to a seismic data format.
I. The process of Embodiment H, wherein the seismic data format comprises SEG-Y or SEG P1.
J. The process of Embodiments H or I, further comprising interpreting the seismic data formatted 3D matrix.
K. The process of Embodiment J, wherein the interpretation is selected from petrophysical, log facies, structural and combinations thereof.
L. The process of Embodiments J or K, further comprising associating the interpretations with a well process at a specific well through the use of unique well identifiers.
M. The process of Embodiment L, wherein the well process comprises completion or production of oil and gas wells.
N. The process of Embodiment L, wherein the well process comprises the creation of pseudo wells to evaluate exploration opportunities.

EXAMPLES

As an example of establishing a single-well, single-node two-dimensional grid, a process according to one embodiment of the invention is applied to hypothetical wells W1, W2, W3 and W4 as shown in FIG. 11. An initial grid is applied with grid nodes GN(0,0) through GN(2,2) as shown in FIG. 12. Next, as shown in FIG. 13, the wells are associated with the closest node, i.e. W1 with GN(0,0), W2 with GN(1,1), W3 with GN(1,1), and W4 with GN(1,2). However, two wells (W2, W3) are associated with GN(1,1), so the grid spacing is reduced, e.g., halved as shown in FIG. 14. In this spacing, the wells are again associated with the closest node, i.e. W1 with GN(0,0), W2 with GN(3,1), W3 with GN(2,2), and W4 with GN(2,4). This grid spacing is suitable because no more than one well is associated with any single node.

As an example of populating non-well nodes, a process according to two different embodiments of the invention is applied to GN(1,1), which is between GN(0,1) and GN(2,1) to which are assigned wells W1 and W2, respectively, as shown in FIG. 15. The generalized well logs for wells W1 and W2, respectively, shown in FIGS. 16 and 17, have stratigraphic correlations A and B with the relationship between depth, Y, and a generalized logging variable X, as follows: over the intervals Y=0→A, X=2; over the intervals Y=A→B, X=1; and over the intervals Y=B→1000, X=3.

In one embodiment where stratigraphic correlations A and B are not used, a mathematical average of the well logging variable for the nearby wells is applied as shown in FIG. 18. In this instance the generalized well log for node GN(1,1) is as follows: over the interval Y=0→A1, X=2; over the interval Y=A1→A2, X=1.5; over the interval Y=A2→B1, X=2; over the interval Y=B1→B2, X=2; and over the interval Y=B2→1000, X=3; where A1 and B1 represent the depth of the stratigraphic correlations at well W1, and A2 and B2 at well W2. This approach tends to blur the well log data for the non-well node being populated across the stratigraphic correlations, but is still useful in one embodiment.

The use of stratigraphic correlations for the same node is illustrated in FIG. 19. In this instance, the height of the correlations A and B at GN(1,1) is taken as a weighted average of the heights of the same correlations at the nearby wells W1 and W2, e.g., A(1,1)=(A1+A2)/2 and B(1,1)=(B1+B2)/2. This provides a more realistic population of the well log data at the non-well nodes, and a more crisp visualization of the data at the stratigraphic correlations that can be expected.

Figure 20:
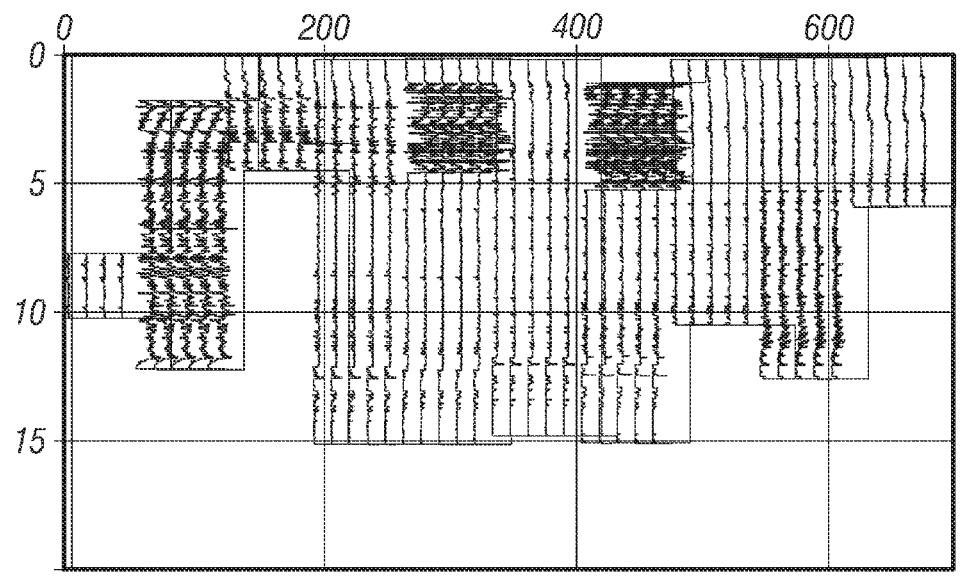
FIG. 20 shows a wiggle trace display of ten well log gamma-ray curves converted into SEG-Y format according to the process shown in FIG. 8.
Figure 21:
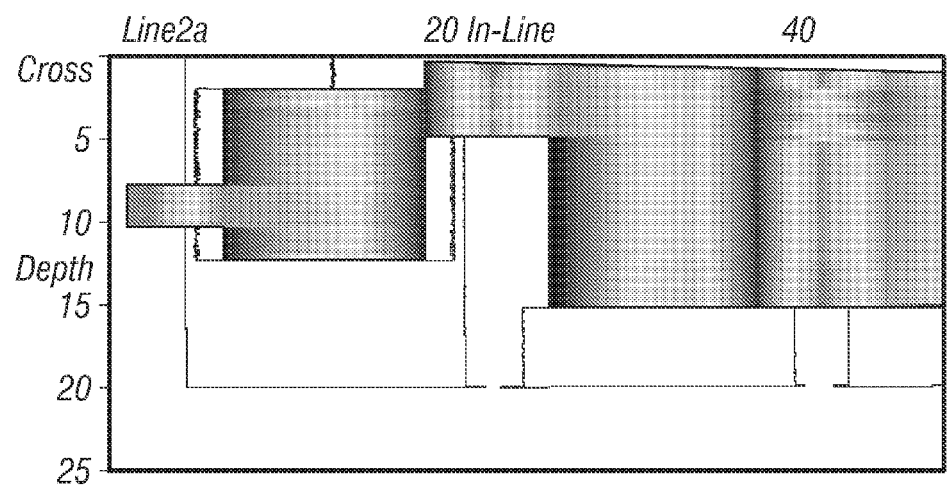
FIG. 21 shows the data shown in FIG. 20 in a commercially available 3D seismic evaluation application.

As is illustrated in FIG. 20, well log data, in this case ten well log gamma-ray curves have been converted into SEG-Y format according to an embodiment of the instant disclosure. The data are shown in a "wiggle trace" display as are readily known to one of minimal skill in the art. FIG. 21 shows the data presented in FIG. 20, presented in a 3D seismic application (OpendTect V.4.0), which is commercially available and readily known to one of skill in the art. As FIGS. 20 and 21 demonstrate, the data produced according to the processes disclosed herein may be interpreted, processed, and manipulated just like seismic data generated from traditional sources.

All documents described herein are incorporated by reference herein, including any patent applications and/or testing procedures to the extent that they are not inconsistent with this application and claims. The principles, preferred embodiments, and modes of operation of the present invention have been described in the foregoing specification. Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

I claim:
1. A process, comprising the steps of:
 a. selecting an initial 2D grid spacing comprising a uniform grid spacing with respect to an X-axis and a uniform grid spacing with respect to a Y-axis, wherein the grid spacing with respect to the X- and Y-axes may be the same or different,
 b. assigning wells from a dataset of well data to closest nodes in the grid, wherein the well data comprise well log data,
 c. if a plurality of wells are assigned to a single node after completing step b, narrowing the grid spacing and repeating step b until no more than one well is assigned to any node, wherein a plurality of the assigned wells are spaced away from the respective closest nodes,
 d. populating the closest nodes with the well data from the assigned wells,
 e. populating non-well nodes with well log data extrapolated from the populated closest nodes to generate an all-node-populated 3D matrix of well log data, and
 f. converting the all-node-populated 3D matrix of well log data to a seismic data format.
2. The process of claim 1, wherein the well data further comprise stratigraphic correlations by well, whereby the 3D matrix comprises stratigraphic correlations assigned to the single-well nodes.
3. The process of claim 2, further comprising populating non-well nodes with stratigraphic correlation data.
4. The process of claim 3 wherein stratigraphic tops are used to control the non-well node population.
5. The process of claim 1 further comprising interpreting the seismic data formatted 3D matrix.
6. The process of claim 1 wherein the seismic data format comprises SEG-Y or SEG P1.
7. The process of claim 5, wherein the interpretation is selected from petrophysical, log facies, structural and combinations thereof.
8. The process of claim 7, further comprising associating the interpretations with a well process at a specific well through the use of unique well identifiers.
9. The process of claim 8, wherein the well process comprises completion or production of oil and gas wells.

10. The process of claim 9, wherein the well process comprises the creation of pseudo wells to evaluate exploration opportunities.

11. A process, comprising the steps of:
associating tabulated well data comprising well log data associated with unique well identifiers and stratigraphic correlations by well with a matrix of grid nodes wherein single wells are assigned to single nodes to generate a 3D matrix of well log data comprising grid nodes with stratigraphic correlations assigned to the single-well nodes, wherein the matrix comprises a uniform grid spacing between the nodes with respect to an X-axis and a uniform grid spacing between the nodes with respect to a Y-axis, wherein the grid spacing with respect to the X- and Y-axes may be the same or different; and
generating the uniform grid spacings with respect to the X- and Y-axes by the steps of:
  a. selecting an initial 2D grid spacing,
  b. assigning wells from a dataset of well data to closest nodes in the grid, and
  c. if a plurality of wells are assigned to a single node after completing step b, narrowing the grid spacing and repeating step b until no more than one well is assigned to any node.

12. The process of claim 11, further comprising populating non-well nodes with stratigraphic correlation data.

13. The process of claim 11, further comprising populating non-well nodes with well log data extrapolated from single-well nodes.

14. The process of claim 12 wherein stratigraphic tops are used to control the non-well node population.

15. The process of claim 13, further comprising converting the all-node-populated 3D matrix of well log data to a seismic data format.

16. The process of claim 15 wherein the seismic data format comprises SEG-Y or SEG P1.

17. The process of claim 15 further comprising interpreting the seismic data formatted 3D matrix.

18. The process of claim 17, wherein the interpretation is selected from petrophysical, log facies, structural and combinations thereof.

19. The process of claim 17, further comprising associating the interpretations with a well process at a specific well through the use of the unique well identifiers.

20. The process of claim 19, wherein the well process comprises completion or production of oil and gas wells.

21. The process of claim 19, wherein the well process comprises the creation of pseudo wells to evaluate exploration opportunities.

* * * * *

UNITED STATES PATENT AND TRADEMARK OFFICE
CERTIFICATE OF CORRECTION

| | |
|---|---|
| PATENT NO. | : 8,694,261 B1 |
| APPLICATION NO. | : 12/911272 |
| DATED | : April 8, 2014 |
| INVENTOR(S) | : Mark C. Robinson |

It is certified that error appears in the above-identified patent and that said Letters Patent is hereby corrected as shown below:

IN THE SPECIFICATION

Column 1, line 7 The number "22" should be --12--.

Signed and Sealed this
Twenty-sixth Day of January, 2016

Michelle K. Lee
*Director of the United States Patent and Trademark Office*